(12) United States Patent
Betin et al.

(10) Patent No.: US 7,899,292 B2
(45) Date of Patent: Mar. 1, 2011

(54) THERMAL NONLINEARITY CELL FOR GUIDING ELECTROMAGNETIC ENERGY THROUGH A NONLINEAR MEDIUM

(75) Inventors: Alexander A. Betin, Manhattan Beach, CA (US); Vladimir V. Shkunov, Torrance, CA (US)

(73) Assignee: Raytheon Company, Waltham, MA (US)

( * ) Notice: Subject to any disclaimer, the term of this patent is extended or adjusted under 35 U.S.C. 154(b) by 700 days.

(21) Appl. No.: 11/893,081

(22) Filed: Aug. 14, 2007

(65) Prior Publication Data

US 2009/0225404 A1 Sep. 10, 2009

(51) Int. Cl.
*H01S 4/00* (2006.01)
*G02B 6/10* (2006.01)

(52) U.S. Cl. .............. 385/122; 359/300; 359/333; 359/338; 385/125; 385/129

(58) Field of Classification Search ............ 359/300, 359/333, 338; 385/122, 125, 129
See application file for complete search history.

(56) References Cited

U.S. PATENT DOCUMENTS

| | | | | |
|---|---|---|---|---|
| 4,423,511 A | * | 12/1983 | Morton | 372/95 |
| 4,773,739 A | * | 9/1988 | Valley et al. | 359/300 |
| 4,879,532 A | * | 11/1989 | Shemwell et al. | 359/27 |
| 4,896,930 A | * | 1/1990 | Tsuchitani et al. | 385/122 |
| 5,206,922 A | * | 4/1993 | Westland et al. | 385/5 |
| 5,726,795 A | | 3/1998 | Betin | |
| 5,729,380 A | * | 3/1998 | Betin et al. | 359/300 |
| 6,339,605 B1 | | 1/2002 | Vetroveck | |
| 6,347,109 B1 | | 2/2002 | Beach et al. | |
| 6,646,793 B2 | * | 11/2003 | Bruesselbach et al. | 359/342 |
| 7,042,631 B2 | * | 5/2006 | Smith et al. | 359/333 |
| 2003/0063884 A1 | * | 4/2003 | Smith et al. | 385/129 |

OTHER PUBLICATIONS

Degnan "The Waveguide Laser: a Review", Applied Physics, vol. 11, pp. 1-33 (1976).*
A.A. Betin, "Phase Conjugation Based on Thermal Nonlinearity," presented at Nonlinear Optics Materials, Fundamentals, and Applications Conference, Maui, Hawaii, July 1996.

(Continued)

*Primary Examiner*—Eric Bolda
(74) *Attorney, Agent, or Firm*—Christie, Parker & Hale, LLP

(57) ABSTRACT

A guiding nonlinearity cell. The novel nonlinearity cell includes a nonlinear medium and a waveguide adapted to guide input electromagnetic energy through the nonlinear medium. In an illustrative embodiment, the cell includes a thin layer of a liquid or solid nonlinear medium disposed between two parallel plates adapted to guide energy through the length of the medium by total internal reflection. The plates can be made from a material having a refractive index less than a refractive index of the medium to provide total internal reflection within the liquid, or they can be made from a material matching the refractive index of the medium such that outer walls of the plates provide total internal reflection, allowing energy to leak into the plates.

46 Claims, 3 Drawing Sheets

OTHER PUBLICATIONS

A.A. Betin, S.C. Matthews, and M.S. Mangir, "Phase Conjugation of Depolarized Light with a Loop PC", Nonlinear Optics: Materials, Fundamentals, and Applications Conference, Kauai, Hawaii, Jul. 1998.

O.L. Antipov, A.A. Betin, E.A. Zhukov and S.G Turgenev, "Four-wave Interaction of Middle-Infrared Radiation in Media with a Thermal Nonlinearity," Sov. J. of Quantum Electronics, 19, Nov. 1989, p. 1465.

A.A. Betin and A.V. Kirsanov, "Selection of a Phase-Conjugate Wave in an Oscillator Based on a Four-Wave Interaction with Feedback in an Extended Nonlinear Medium," Quantum Electronics, 24, 1994, p. 219.

K. Ergakov and V. Yarovoy, "Investigation of Energy and Adaptive Capabilities of Four-Wave Mixing Scheme with a Feedback (FWMF) on YAG:Nd-active Medium in Single and Repetitive Pulse Generation Regimes," in Phase Conjugation and Adaptive Optics, SPIE Proceedings, vol. 2771, 1996, p. 75.

* cited by examiner

THERMAL NONLINEARITY CELL FOR GUIDING ELECTROMAGNETIC ENERGY THROUGH A NONLINEAR MEDIUM

BACKGROUND OF THE INVENTION

1. Field of the Invention

The present invention relates to laser systems. More specifically, the present invention relates to nonlinear optics and high power lasers.

2. Description of the Related Art

Nonlinearity cells are commonly used in applications such as phase conjugate mirrors to generate real-time holograms. A nonlinearity cell typically includes a window containing one or more layers of a nonlinear optical medium whose optical properties (usually its refractive index) change in response to the presence of light. When an interference pattern formed by two beams of light is applied to the nonlinear medium, the interference pattern is reproduced in the medium as a pattern of high and low refractive index, effectively creating a diffraction grating that is a real-time hologram of the optical interference pattern. The nonlinear medium tracks changes in the interference pattern formed by the two beams such that as the interference pattern changes, the diffraction pattern in the medium changes as well.

A loop phase conjugate mirror (LPCM) system typically uses a liquid thermal nonlinearity cell in a four-wave mixing configuration to create a holographic mirror. Four-wave mixing involves the use of two counter propagating pump beams and a nonlinear medium. The beams propagate through the medium along with a signal beam of which a phase conjugate beam is to be generated. The signal beam propagates through the medium at an angle relative to at least one of the pump beams and thereby creates an interference pattern. The remaining pump beam reads the interference pattern as a hologram producing a phase conjugate return of the signal beam.

The absorption of light makes the thermal nonlinearity cell operational. The same absorption process, however, heats the nonlinear medium; that heat must be removed to avoid optical damage. The cell must be designed such that the absorption and attendant temperature contrast are adequate to produce the desired effect; but: the maximum temperature anywhere within the liquid medium must remain below the boiling point of the liquid. This can be a problem for high power applications.

Conventional thermal nonlinearity cells typically include a thin layer of slightly absorptive liquid (usually an organic solvent) placed between a transparent window and a highly reflective mirror, which may be cooled to provide a constant temperature heatsink. However, a single thin layer thermal cell usually cannot provide good phase conjugation fidelity due to the insufficient selectivity of a conjugated wave by a thin hologram. In addition, a one-layer hologram is not well projected to high power scaling because its capability in sustaining high laser power and thermal load in just one layer of absorbing liquid could be limited.

Other thermal cell designs for use in LPCM systems in particular have used one or more thin layers of liquid sandwiched between a series of optically transparent windows. The liquid is forced to flow to remove the generated heat by moving the heated liquid away from the laser interaction region. This technique, however, requires a mechanical means for providing the liquid flow, such as pumps, etc., which may be costly to construct and operate. In addition, the flow velocity of the liquid should be carefully controlled such that it has a capability to remove the overall heat but not destroy the positive effect of local heating that results in the hologram fringes recording. The hologram may be washed out if the liquid is moved too quickly. For high average power operation, the flow velocity and the pressure drop could be too high to be able to project to the desired power scalability.

Another prior approach described in a patent application entitled CONDUCTIVELY COOLED LIQUID THERMAL NONLINEARITY CELL FOR PHASE CONJUGATION AND METHOD, Ser. No. 10/866,201 filed Jun. 10, 2004 by A. A. Betin, N. P. Davis and J. J. Ichkhan, the teachings of which are hereby incorporated herein by reference, used a conductively cooled cell comprised of a multi-layer transmission cell with thermally conductive windows that removed heat to peripheral heat sinks. Practical implementation of this approach relies on good quality optics and multiple surfaces with complex high transmission and/or high reflective coatings, which may lead to excessive losses and compatibility problems with the nonlinear liquid. Another problem in practical implementation comes from the fact that the liquid layers should be very thin for rapid heat transfer, but should have enough absorption for the thermal nonlinearity mechanism to take place. A high absorption coefficient in liquid is typically achieved by adding special impurities into the liquid that are absorptive at the laser-wavelength, thus creating a problem with the choice of materials and compatibility with the liquid and its stability.

Hence, a need exists in the art for an improved nonlinearity cell design that offers higher performance, robustness, and easier maintenance with the capability of power and fidelity scalability for high power applications.

SUMMARY OF THE INVENTION

The need in the art is addressed by the guiding nonlinearity cell of the present invention. The novel nonlinearity cell includes a nonlinear medium and a waveguide adapted to guide input electromagnetic energy through the nonlinear medium. In an illustrative embodiment, the cell includes a thin layer of a liquid nonlinear medium disposed between two parallel plates adapted to guide energy through the length of the medium by total internal reflection. The plates can be made from a material having a refractive index less than a refractive index of the medium to provide total internal reflection within the liquid, or they can be made from a material matching the refractive index of the medium allowing energy to leak into the plates such that outer walls of the plates provide total internal reflection. By keeping the nonlinear layer thin in the transverse direction, heat can be rejected conductively through the waveguiding plates.

BRIEF DESCRIPTION OF THE DRAWINGS

FIG. 2 is a simplified schematic of a nonlinearity cell designed in accordance with an illustrative embodiment of the present teachings.

FIG. 2b is a sectional side view of the illustrative nonlinearity cell of FIG. 2a.

FIG. 4b shows the shape of the angular spectrum $\theta_x$ of light inside the illustrative cell for the configuration of FIG. 4a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
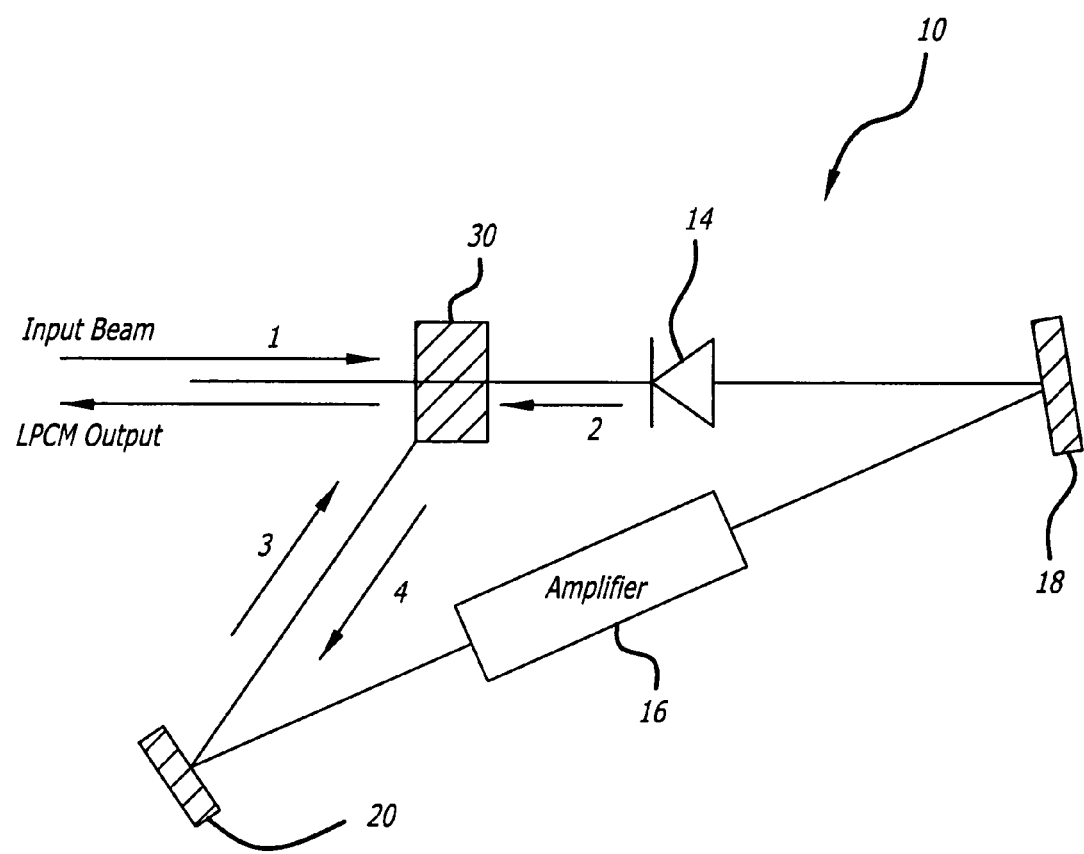
FIG. 1 is an optical schematic of a loop phase conjugate mirror system using a guided thermal nonlinearity cell designed in accordance with an illustrative embodiment of the present teachings.

FIG. 1 is an optical schematic of a loop phase conjugate mirror (LPCM) system 10 that represents a major system for applying a guided thermal nonlinearity cell 30 designed in accordance with an illustrative embodiment of the present teachings. The illustrative system 10 uses the nonlinearity cell 30 in a four-wave mixing (FWM) configuration to create a holographic mirror of a ring resonator. The system 10 includes a loop formed by (traversing the loop clockwise in FIG. 1) the novel nonlinearity cell 30 (the details of which are described more fully below), a Faraday isolator 14, a first mirror 18, an amplifier 16, and a second mirror 20.

In operation, an input beam 1 enters the cell 30 from the left and traverses the loop in a clockwise direction, where it becomes beam 3. The Faraday isolator 14 attenuates the beam sufficiently to prevent saturation of the amplifier 16 and provide a beam 3 of comparable intensity to incident beam 1. Beams 1 and 3 then interfere within the nonlinearity cell 30 creating fringes of high and low intensity in an optical interference pattern. The nonlinearity cell 30 reproduces the optical fringe pattern as a pattern of high and low refractive index, effectively creating a real-time hologram of the optical interference pattern. This hologram serves as a resonator mirror allowing a beam to grow from noise in a counterclockwise direction around the loop formed by the hologram and the two fixed mirrors. The condition for oscillation is met when the gain of the amplifier 16 exceeds the losses in the loop. Beam 2 is the laser beam that builds in this manner which, when diffracted by the hologram, becomes beam 4. The undiffracted portion of beam 2 is transmitted through the nonlinearity cell 12 and becomes the LPCM output beam.

For this resonator configuration, the lowest order mode is that for which beam 2 is the phase conjugate of beam 1. By optical reciprocity, beam 4 is also the phase conjugate of beam 3. Under the right mode selection conditions, the phase conjugate mode is the dominant mode within the resonator. For a more detailed description describing the operation of a loop phase conjugate mirror configuration, see "Phase Conjugation Based on Thermal Nonlinearity" by A. A. Betin, presented at Nonlinear Optics: Materials, Fundamentals, and Applications Conference, Maui, Hawaii, July 1996; or "Phase Conjugation of Depolarized Light with a Loop PC" by A. A. Betin, S. C. Matthews, and M. S. Mangir, presented at Nonlinear Optics: Materials, Fundamentals, and Applications Conference, Kauai, Hawaii, July 1998, the teachings of which are incorporated herein by reference.

Figure 2A:
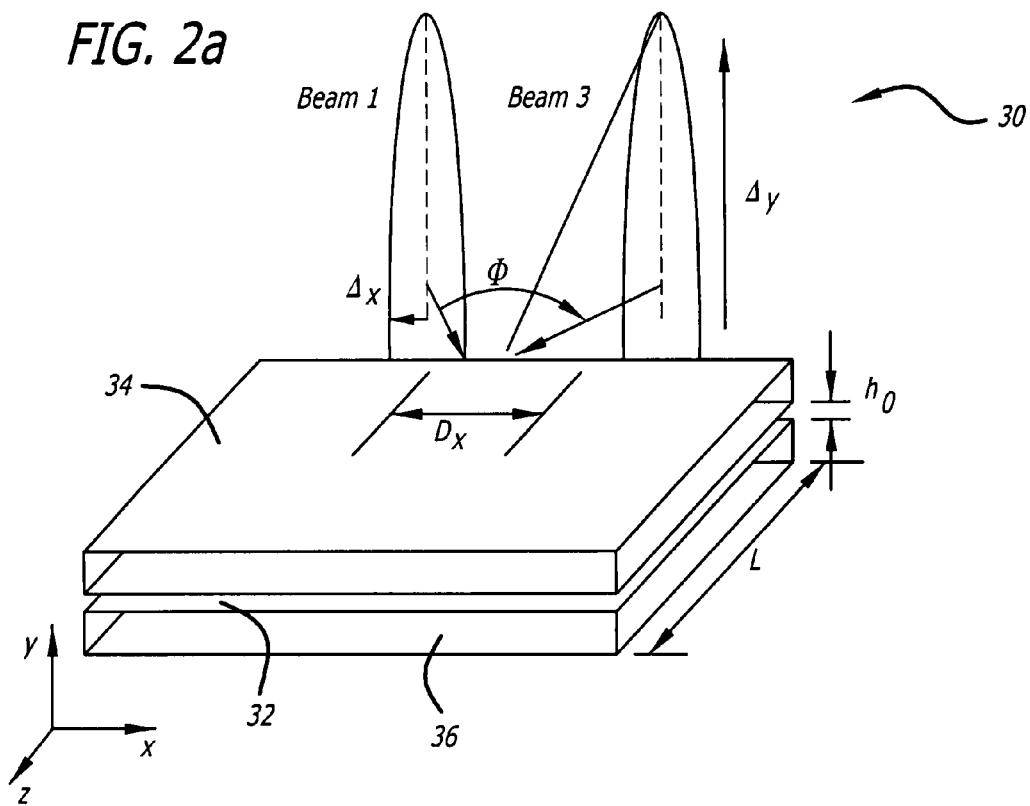
Figure 2B:
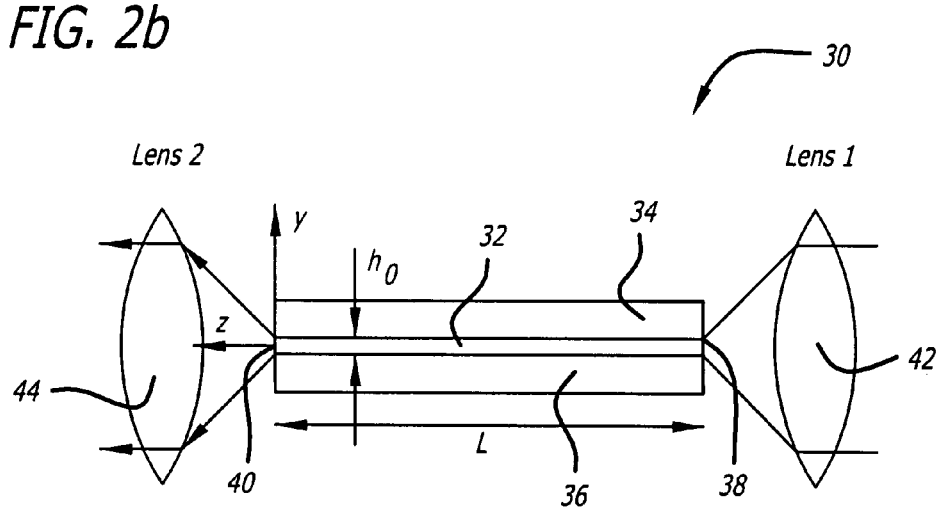

FIG. 2a is a simplified schematic of a nonlinearity cell 30 designed in accordance with an illustrative embodiment of the present teachings. FIG. 2b is a sectional side view of the illustrative nonlinearity cell 30 of FIG. 2a. The novel nonlinearity cell 30 includes a layer of nonlinear liquid 32 disposed between two parallel plates 34 and 36 that form a planar waveguide. A laser beam is launched through an entrance window 38 (the entrance window 38 is perpendicular to the two plates, as shown in FIG. 2b) into the nonlinear liquid 32 and then propagates (preferably by total internal reflections) without significant losses through the liquid 32 and exits through an exit window 40 (the exit window 40 is perpendicular to the two plates, as shown in FIG. 2b).

As shown in FIGS. 2a and 2b, the nonlinear liquid layer 32 has a thickness $h_0$ (the distance between the two plates 34 and 36, along the y-axis). In a preferred embodiment, the liquid layer 32 is thin enough to effectively eject heat to the plates 34 and 36. Heat can then be further conducted through the plates to a heat sink (a cooling liquid, solid, or air).

In the illustrative embodiment of FIGS. 2a and 2b, the plates 34 and 36 are made from a material having a refractive index $n_w$, less than the refractive index $n_L$, of the liquid to provide total internal reflection (TIR) at the liquid boundaries. In a preferred embodiment, the plates 34 and 36 are made from a material having a high thermal conductivity such as sapphire or YAG.

Input beams travel through the length of the liquid layer 32 (along the z-axis), instead of in the thin direction (along the y-axis) as in conventional designs. The cell 30 has a length L (between the input window 38 and exit window 40), which can be made long enough to reduce the heat flux value as desired. In a preferred embodiment, the length L is more than 100 times longer than the thickness $h_0$.

The waveguiding cell 30 of the present invention thus provides a longer pass of beam interaction through the grating. The longer path allows for the use of the natural absorption of pure high dn/dT liquids without admixing absorbing dies that suffer from short lifetimes due to thermal decomposition.

For a LPCM application, the grating-writing beam 1 and beam 3 (as shown in FIGS. 1 and 2a) can be focused along the layer plane by a cylindrical lens 42 (shown in FIG. 2b) into the input window 38 of the liquid layer to form high aspect ratio beam footprints. The focused beam matches the liquid layer thickness $h_0$ along the "fast axis" of the layer (y-direction) to be trapped by TIR inside the liquid layer 32 and to avoid optical loss. Both beams stay collimated along the "slow axis" of the layer (x-direction) to cross each other at a small angle $\phi$. The transmitted beam 1 is collimated after the cell back by a second cylindrical lens 44. The same lens 44 is used to focus back the beam 2 (see FIG. 1) into the nonlinear layer 32. The cell 30 can be cooled through the plate surfaces to reduce the temperature inside the absorbing layer 32.

Analysis shows that for proper operation of the cell 30 for a LPCM application, the following geometrical conditions should be satisfied:

1. The convergence angle $\Delta_y$ of the focused beams inside the liquid layer 32 should be chosen to be less than the TIR angle $\theta_{TIR}$ to avoid optical leaks from the liquid to the plates.
2. The crossing angle $\phi$ and the liquid layer thickness $h_0$ should be matched to make the interference fringe spacing $\Lambda \approx \lambda/\phi$ larger than the thickness $h_0$ to eliminate beam breaking instability for the counter-propagating beam 1 and beam 2.
3. The length of the cell L and the crossing angle $\phi$ should be matched such that the beams crossing distance $D_x/\phi$ is longer than the length L to provide beam overlap inside the nonlinear layer 32.
4. The angular divergence $2\Delta_x$ of the beams in the slow axis direction (the direction in-plane of the waveguide) should be made less than the angle $\phi$ between the beam 1 and beam 3 to provide good fidelity of beam reconstruction at the dynamic holographic grating.

5. The convergence angle $\Delta_y$ of the beams in the fast axis direction (the direction across the waveguide plane) should be chosen less than $(L/\lambda)\phi^3$ to minimize the cross-modulation noise of the noise readout.

Figure 3:
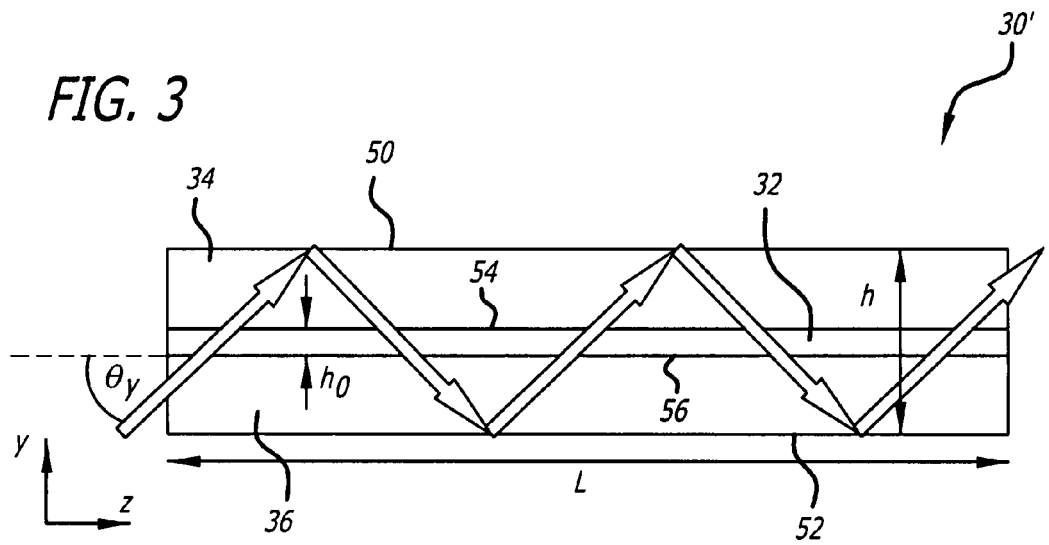
FIG. 3 is a side view of an alternative embodiment of a nonlinearity cell designed in accordance with the present teachings.

FIG. 3 is a side view of an alternative embodiment of a nonlinearity cell 30' designed in accordance with the present teachings, suitable for high power applications. The difference between this embodiment and that of FIGS. 2a and 2b is in the location of the TIR guiding walls. In the embodiment of FIG. 3, the outer walls 50 and 52 of the plates 34 and 36, respectively, are made TIR reflecting. The borders 54 and 56 between the liquid 32 and the plates 34 and 36 are made transparent instead, by matching the refractive indexes $n_L=n_W$, or by means of antireflection coating designed to provide low reflectivity for slanted incidence.

This embodiment may be easier to implement than the embodiment of FIGS. 2a and 2b because it may be easier to match the refractive indexes of the plates and the liquid than to find a plate material having a lower refractive index than the nonlinear liquid.

An advantage of this embodiment is that the waveguide can be made $h/h_0$ thicker (where h is the distance between the outer surfaces 50 and 52 of the plates). The second condition listed above limits the liquid layer thickness to be narrow, $h_0<30$-100 microns for a feasible range of the crossing angle $\phi\sim10$-30 mrad. High total input light power applications should have a larger waveguide area to reduce light intensity and the optical load on the liquid. In addition, a thicker guiding layer allows for a proportional reduction of the convergence angle $\Delta_y$ at focusing the beam of the same level of fast axis aberrations. A smaller convergence angle $\Delta_y$ facilitates fulfilling the first and fifth conditions listed above for highly aberrated beams at axial propagation. Another advantage is that it broadens the range of compatible materials for both the liquid and the plates by eliminating the requirement to get the refractive index of the liquid above the index of the plate material. One has to pay for these advantages: for a liquid layer thickness that is the same as the embodiment of FIGS. 2a and 2b, the liquid absorption coefficient of the cell length L should be increased to match the total absorption to the original level. This is because the total both absorption and beam interaction length with the liquid per unit cell length for every ray (see FIG. 3) becomes about $h/h_0$ smaller.

Figure 4A:
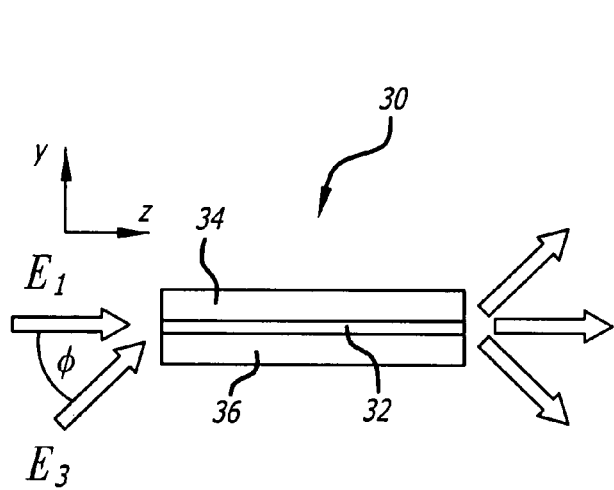
FIG. 4a is a side view of an illustrative nonlinearity cell designed in accordance with the present teachings, showing an alternate geometry for coupling input writing beams into the waveguide.
Figure 4B:
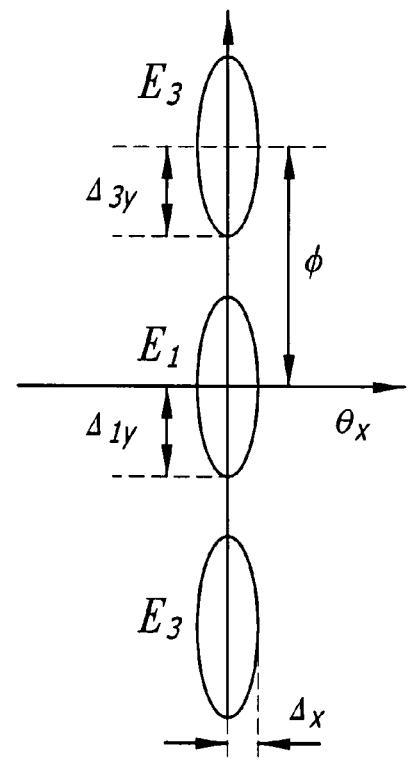

FIG. 4a is a side view of an illustrative nonlinearity cell 30 designed in accordance with the present teachings, showing an alternate geometry for coupling the input writing beams into the waveguide. FIG. 4b shows the shape of the angular spectrum $\theta_x$ of light inside the cell 30. In this embodiment, instead of crossing both beam 1 and beam 3 separating them in-plane at axial propagation (where both beams are parallel to the z-axis and separated by a tilt angle $\phi$ in the x-axis direction, as shown in FIG. 2a), only beam 1 is chosen to propagate in-plane along the waveguide axis (z-axis). Beam 3 is focused such that it is tilted across the waveguide plane (in the y-axis direction) at an angle $\phi$ to propagate zigzagging between the plates 34 and 36. The tilt angle should exceed, in this case, a sum of the angular spreads for both interfering beams to separate the beams in the angular space: $\phi>2\Delta_y$.

A specific feature of this configuration is the larger crossing angle $\phi$ between the beams that becomes comparable to the TIR angle of the waveguide. This corresponds to a shorter fringe spacing $\Lambda\approx\lambda/2\sin(\phi)$. The interference fringe orientation is also different. The fringes are not perpendicular to the waveguide plane anymore, but represent a complicated pattern consisting of a few overlapped families of fringes, including fringes tilted at about $\phi/2$ with respect to the axis and parallel to the axis.

Thus, the nonlinear cell of the present teachings uses waveguiding to guide input beams down a long path through the nonlinear medium, allowing for the use of a nonlinear liquid with lower absorption coefficients (even pure liquids may possibly be used, which helps with compatibility and stability issues). The nonlinear layer is kept thin in the transverse direction, allowing heat to be rejected conductively through the waveguiding plates. The length of the cell can be long enough to reduce the level of heat flux per unit area to be rejected, leading to simpler cooling solutions. The cell design does not require multiple optical elements/windows or mechanisms for flowing the liquid, resulting in simpler, more robust designs. In addition, the design does not require complex transmission or reflective coatings that could increase unwanted losses.

Thus, the present invention has been described herein with reference to a particular embodiment for a particular application. Those having ordinary skill in the art and access to the present teachings will recognize additional modifications, applications and embodiments within the scope thereof. For example, the novel nonlinearity cell of the present invention has been described above with reference to a loop phase conjugate mirror application; however, the nonlinearity cell can also be used in other applications without departing from the scope of the present teachings.

It is therefore intended by the appended claims to cover any and all such applications, modifications and embodiments within the scope of the present invention.

Accordingly,

What is claimed is:

1. A nonlinearity cell comprising:
a nonlinear medium;
waveguiding means for guiding input electromagnetic energy through said nonlinear medium; and
a first window adapted to transmit first and second beams into said nonlinear medium,
wherein a crossing angle between said first and second beams is matched with a thickness of said nonlinear medium such that an interference fringe spacing is larger than said thickness.

2. The invention of claim 1 wherein said nonlinear medium is a liquid.

3. The invention of claim 1 wherein said nonlinear medium is a solid.

4. The invention of claim 1 wherein said waveguiding means is a planar waveguide.

5. The invention of claim 4 wherein said waveguide includes two parallel plates disposed on opposite sides of said nonlinear medium.

6. The invention of claim 5 wherein said nonlinear medium is disposed between said plates in a thin layer.

7. The invention of claim 5 wherein said plates are adapted to provide total internal reflection of said electromagnetic energy.

8. The invention of claim 5 wherein said plates are made from a material having a refractive index less than a refractive index of said medium to provide total internal reflection.

9. The invention of claim 5 wherein borders between said plates and nonlinear medium are optically transparent.

10. The invention of claim 9 wherein said plates are made from a material having a refractive index matching a refractive index of said medium.

11. The invention of claim 9 wherein inner walls of said plates bordering said medium are coated with antireflection coating.

12. The invention of claim 9 wherein outer walls of said plates are designed to provide total internal reflection.

13. The invention of claim 1 wherein said first and second beams interfere with each other and thereby create an interference pattern in said cell.

14. The invention of claim 13 wherein said interference pattern is sampled by said nonlinear medium.

15. The invention of claim 1 wherein said nonlinearity cell further includes a focusing means for focusing said first and second beams into said nonlinear medium.

16. The invention of claim 15 wherein said focusing means is adapted to form focused beams having high aspect ratio footprints.

17. The invention of claim 16 wherein said focused beams match a thickness of said nonlinear medium along a fast axis.

18. The invention of claim 15 wherein said focusing means includes a first cylindrical lens.

19. The invention of claim 1 wherein said nonlinearity cell further includes a second window opposite said first window adapted to output said first beam.

20. The invention of claim 14 wherein said nonlinearity cell further includes a second window opposite said first window adapted to output said first beam;
and a second cylindrical lens adapted to collimate energy output from said second window.

21. The invention of claim 1 wherein said first and second beams propagate in-plane along a waveguide axis.

22. The invention of claim 21 wherein said first and second beams are separated by a tilt angle in a slow axis direction of said waveguide.

23. The invention of claim 1 wherein said first and second beams are separated by a tilt angle in a fast axis direction of said waveguide.

24. A nonlinearity cell comprising:
a planar waveguide formed from two parallel plates;
a nonlinear medium disposed between said plates; and
a first window adapted to transmit first and second beams into said nonlinear medium,
wherein a crossing angle between said first and second beams is matched with a thickness of said nonlinear medium such that an interference fringe spacing is larger than said thickness.

25. The invention of claim 24 wherein said plates are made from a material having a refractive index less than a refractive index of said medium to provide total internal reflection of electromagnetic energy within said nonlinear medium.

26. The invention of claim 24 wherein borders between said plates and said nonlinear medium are optically transparent.

27. The invention of claim 26 wherein said plates are made from a material having a refractive index matching a refractive index of said medium.

28. The invention of claim 26 wherein inner walls of said plates bordering said medium are coated with antireflection coating.

29. The invention of claim 26 wherein outer walls of said plates are designed to provide total internal reflection of electromagnetic energy within said cell.

30. The invention of claim 24 wherein said first and second beams interfere with each other and thereby create an interference pattern in said cell.

31. The invention of claim 30 wherein said interference pattern is sampled by said nonlinear medium.

32. The invention of claim 31 wherein a convergence angle of said first and second beams is less than a total internal reflection angle of said waveguide.

33. The invention of claim 31 wherein a length of said cell is matched with the crossing angle between said first and second beams such that a crossing distance of said beams is longer than said length.

34. The invention of claim 31 wherein an angular divergence of said first and second beams in a slow-axis direction is less than the crossing angle between said first and second beams.

35. The invention of claim 31 wherein a convergence angle of said first and second beams is less than $(L/\lambda)\phi^3$), where L is a length of said cell, $\lambda$ is a wavelength of said first and second beams, and $\phi$ is the crossing angle between said first and second beams.

36. A phase conjugation system comprising:
a nonlinearity cell comprised of a nonlinear medium and a waveguide adapted to guide an input beam such that it propagates through said nonlinear medium and emerges from said cell as a loop beam;
optics adapted to direct said loop beam back to said nonlinearity cell such that it intersects and optically interferes with said input beam to form a diffraction grating in said cell, said optics and diffraction grating forming an optical loop; and
an amplifier positioned in said optical loop such that an oscillation beam builds up from optical noise in a direction counter to a propagation direction of said loop beam, with a portion of said oscillation beam being transmitted by said diffraction grating and exiting said cell as an output beam,
wherein a crossing angle between said input beam and said loop beam is matched with a thickness of said nonlinear medium such that an interference fringe spacing is larger than said thickness.

37. The invention of claim 36 wherein said nonlinear medium in said waveguide is a liquid.

38. The invention of claim 36 wherein said nonlinear medium in said waveguide is a solid.

39. The invention of claim 36 wherein said waveguide is a planar waveguide.

40. The invention of claim 36 wherein a convergence angle of said input beam and said loop beam inside said cell is less than a total internal reflection angle of said waveguide.

41. The invention of claim 36 wherein a length of said cell is matched with the crossing angle between said input beam and said loop beam such that a crossing distance of said beams is longer than said length.

42. The invention of claim 36 wherein an angular divergence of said input beam and said loop beam in a slow-axis direction is less than the crossing angle between said input beam and said loop beam.

43. A phase conjugation system comprising:
a nonlinearity cell comprised of a nonlinear medium and a waveguide adapted to guide an input beam such that it propagates through said nonlinear medium and emerges from said cell as a loop beam;
optics adapted to direct said loop beam back to said nonlinearity cell such that it intersects and optically interferes with said input beam to form a diffraction grating in said cell, said optics and diffraction grating forming an optical loop; and
an amplifier positioned in said optical loop such that an oscillation beam builds up from optical noise in a direction counter to a propagation direction of said loop beam, with a portion of said oscillation beam being transmitted by said diffraction grating and exiting said cell as an output beam, wherein a convergence angle of said input beam and said loop beam is less than $(L/\lambda)\phi^3$, where L is a length of said cell, $\lambda$ is a wavelength of said input beam and said loop beam, and $\phi$ is a crossing angle between said input beam and said loop beam.

44. A method for designing a nonlinearity cell including the steps of:

providing a thin layer of a nonlinear medium;

placing two parallel plates on opposite sides of said nonlinear medium such that input electromagnetic energy propagates through said nonlinear medium by total internal reflection; and providing a first window adapted to transmit first and second input beams into said nonlinear medium, wherein a crossing angle between said first and second beams is matched with a thickness of said nonlinear medium such that an interference fringe spacing is larger than said thickness.

45. The nonlinearity cell of claim 1, wherein a convergence angle of said first and second beams is less than a total internal reflection angle of said waveguiding means, a length of said cell is matched with the crossing angle between said first and second beams such that a crossing distance of said beams is longer than said length, an angular divergence of said first and second beams in a slow-axis direction is less than the crossing angle between said first and second beams; and the convergence angle of said first and second beams is less than $(L/\lambda)\phi^3$, where L is the length of said cell, $\lambda$ is a wavelength of said first and second beams, and $\phi$ is the crossing angle between said first and second beams.

46. The phase conjugation system of claim 36, wherein a convergence angle of said input beam and said loop beam is less than a total internal reflection angle of said waveguide, a length of said cell is matched with the crossing angle between said input beam and said loop beam such that a crossing distance of said beams is longer than said length, an angular divergence of said input beam and said loop beam in a slow-axis direction is less than the crossing angle between said input beam and said loop beam; and the convergence angle of said input beam and said loop beam is less than $(L/\lambda)\phi^3$, where L is the length of said cell, $\lambda$ is a wavelength of said input beam and said loop beam, and $\phi$ is the crossing angle between said input beam and said loop beam.

* * * * *

UNITED STATES PATENT AND TRADEMARK OFFICE
CERTIFICATE OF CORRECTION

PATENT NO. : 7,899,292 B2  Page 1 of 1
APPLICATION NO. : 11/893081
DATED : March 1, 2011
INVENTOR(S) : Alexander A. Betin et al.

It is certified that error appears in the above-identified patent and that said Letters Patent is hereby corrected as shown below:

Column 9, Claim 45, line 26   Delete "length." Insert -- length, --

Signed and Sealed this
Fourth Day of October, 2011

David J. Kappos
*Director of the United States Patent and Trademark Office*